United States Patent
Yang et al.

(10) Patent No.: US 10,839,186 B2
(45) Date of Patent: Nov. 17, 2020

(54) DISPLAY DEVICE, MOBILE TERMINAL AND TABLET PERSONAL COMPUTER

(71) Applicant: GUANGDONG OPPO MOBILE TELECOMMUNICATIONS CORP., LTD., Guangdong (CN)

(72) Inventors: Le Yang, Guangdong (CN); Haiping Zhang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 15/927,871

(22) Filed: Mar. 21, 2018

(65) Prior Publication Data

US 2018/0330141 A1   Nov. 15, 2018

(30) Foreign Application Priority Data

May 12, 2017   (CN) .......................... 2017 1 0342709

(51) Int. Cl.
| | |
|---|---|
| G06K 9/00 | (2006.01) |
| G06F 1/16 | (2006.01) |
| H04M 1/02 | (2006.01) |
| H04M 1/67 | (2006.01) |
| G06F 3/041 | (2006.01) |

(52) U.S. Cl.
CPC ....... *G06K 9/00013* (2013.01); *G06F 1/1684* (2013.01); *G06F 3/0412* (2013.01); *H04M 1/026* (2013.01); *H04M 1/0268* (2013.01); *H04M 1/67* (2013.01); *G06F 1/1652* (2013.01); *G06F 2203/04102* (2013.01)

(58) Field of Classification Search
USPC .......................................................... 382/100
See application file for complete search history.

(56) References Cited

U.S. PATENT DOCUMENTS

| | | | |
|---|---|---|---|
| 2005/0157911 A1* | 7/2005 | Iseri | G06K 9/00026 382/124 |
| 2006/0001651 A1 | 1/2006 | Weng et al. | |

(Continued)

FOREIGN PATENT DOCUMENTS

| | | |
|---|---|---|
| CN | 105872137 A | 8/2016 |
| CN | 106203337 A | 12/2016 |

(Continued)

OTHER PUBLICATIONS

European Patent Application No. 18159466.4 extended Search and Opinion dated Sep. 19, 2018, 5 pages.

(Continued)

*Primary Examiner* — Stephen P Coleman
(74) *Attorney, Agent, or Firm* — Lathrop GPM LLP (57) ABSTRACT

A display device is provided and includes a flexible display screen, a fingerprint identification sensor and a support frame. The support frame includes a bottom wall and a side wall surrounding the bottom wall, the bottom wall and the side wall cooperatively define an accommodating space. The fingerprint identification sensor is received in the accommodating space. The side wall has a top end, the top end has a first face facing the flexible display screen and a second face abutting with the fingerprint identification sensor. A mobile terminal is further provided.

20 Claims, 5 Drawing Sheets

(56) References Cited

U.S. PATENT DOCUMENTS

| | | | |
|---|---|---|---|
| 2008/0025581 A1* | 1/2008 | Chen | G06K 9/0002 |
| | | | 382/124 |
| 2009/0103255 A1* | 4/2009 | Wang | H04N 5/2251 |
| | | | 361/679.21 |
| 2014/0111920 A1* | 4/2014 | Takita | H05K 5/069 |
| | | | 361/679.01 |
| 2014/0355376 A1 | 12/2014 | Schneider et al. | |
| 2015/0036065 A1 | 2/2015 | Yousefpor et al. | |
| 2015/0070324 A1 | 3/2015 | Han et al. | |
| 2015/0256658 A1* | 9/2015 | Shin | G06F 1/1637 |
| | | | 455/566 |
| 2017/0123454 A1 | 5/2017 | Evans et al. | |
| 2017/0177032 A1* | 6/2017 | Cheng | G06F 1/1637 |
| 2017/0177140 A1* | 6/2017 | Lee | G06F 21/32 |
| 2017/0285778 A1* | 10/2017 | Liang | G06K 9/00053 |
| 2017/0300736 A1* | 10/2017 | Song | G06K 9/00033 |

FOREIGN PATENT DOCUMENTS

| | | |
|---|---|---|
| CN | 106339125 A | 1/2017 |
| CN | 205983304 U | 2/2017 |
| CN | 106662900 A | 5/2017 |
| CN | 106993072 A | 7/2017 |
| CN | 107241468 A | 10/2017 |
| TW | I549064 B | 9/2016 |

OTHER PUBLICATIONS

PCT/CN2018/078052 International Search Report and Written Opinion dated May 30, 2018, 11 pp.

Taiwan Patent Application No. 107102432 Office Action dated Feb. 20, 2019, 8 pages.

Chinese Patent Application No. 201710342709.3 English translation of Office Action dated Mar. 20, 2019, 7 pages.

Chinese Patent Application No. 201710342709.3 Office Action dated Mar. 20, 2019, 7 pages.

Chinese Patent Application No. 201710342709.3 Decision of Rejection dated Mar. 4, 2020, 4 pages.

Chinese Patent Application No. 201710342709.3 English translation of Decision of Rejection dated Mar. 4, 2020, 6 pages.

\* cited by examiner

1: a flexible display screen;
2: a fingerprint identification sensor;
3: a support frame;
100: a display device.

1: a flexible display screen;
2: a fingerprint identification sensor;
300: a mainboard.

Fig. 5

DISPLAY DEVICE, MOBILE TERMINAL AND TABLET PERSONAL COMPUTER

CROSS-REFERENCE TO RELATED APPLICATION

This application claims priority to and benefits of Chinese Patent Application No. 201710342709.3, filed with State Intellectual Property Office on May 12, 2017, the entire content of which is incorporated herein by reference.

FIELD

The present disclosure relates to a technical field of communication equipment, and more particularly to a display device and a mobile terminal and tablet personal computer applied with the display device.

BACKGROUND

A front face of a current mobile phone is generally provided with a fingerprint identification sensor and a display screen, and the fingerprint identification sensor and the display screen are superimposed to increase a screen-to-body ratio of the mobile phone. At the same time, a flexible display screen can be used to form a foldable mobile terminal, to achieve a large screen display.

SUMMARY

On the one hand, a display device is provided and includes a flexible display screen, a fingerprint identification sensor and a support frame. The support frame includes a bottom wall and a side wall surrounding the bottom wall, and the bottom wall and the side wall cooperatively define an accommodating space. The fingerprint identification sensor is received in the accommodating space. The side wall has a top end, the top end has a first face facing the flexible display screen and a second face abutting with the fingerprint identification sensor.

On the other hand, a mobile terminal is provided and includes a mainboard and a display device. The display device includes a flexible display screen, a fingerprint identification sensor and a support frame. The support frame includes a bottom wall and a side wall surrounding the bottom wall, the bottom wall and the side wall cooperatively define an accommodating space, the fingerprint identification sensor is received in the accommodating space. The side wall has an end, spaced from the bottom wall, provided with a boss, the boss has a lower surface in contact with a surface, facing the flexible display screen, of the fingerprint identification sensor, and a upper surface in contact with the flexible display screen. The flexible display screen and the fingerprint identification sensor both are electrically coupled with the mainboard.

The present application further provides a tablet personal computer. The tablet personal computer includes a mainboard and a display device. The display device includes an OLED display panel, a fingerprint identification sensor and a support frame. The support frame defines an accommodating groove, the fingerprint identification sensor is received in the accommodating space. The accommodating groove has a side wall and a bottom wall, the side wall has an end, spaced from the bottom wall, provided with a boss, the boss has a lower surface in contact with a surface, facing the OLED display panel, of the fingerprint identification sensor, and an upper surface in contact with the OLED display panel. The OLED display panel and the fingerprint identification sensor both are electrically coupled with the mainboard.

BRIEF DESCRIPTION OF THE DRAWINGS

To describe technical solutions in embodiments of the present disclosure more clearly, the following will briefly introduce the accompanying drawings required for the description of the embodiments. Obviously, the accompanying drawings described below only show some embodiments of the present disclosure, and those skilled in the art can obtain other drawings based on these drawings without paying creative efforts.

DETAILED DESCRIPTION

Technical schemes in embodiments of the present disclosure will be described in combination with drawings in embodiments of the present disclosure. Obviously, the described embodiments are just a part of embodiments of the present disclosure, instead of all the embodiments. Based on the embodiments in the present disclosure, all the other embodiments acquired by those skilled in the art without paying creative efforts belong to a scope protected by the present disclosure.

In the specification, unless specified or limited otherwise, relative terms such as "central", "longitudinal", "lateral", "front", "rear", "right", "left", "inner", "outer", "lower", "upper", "horizontal", "vertical", "above", "below", "up", "top", "bottom" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation.

In the present invention, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, the term "a plurality of" means two or more than two, unless specified otherwise.

In an embodiment, a display device is provided. The display device includes a flexible display screen, a fingerprint identification sensor and a support frame. The support frame includes a bottom wall and a side wall provided around a periphery of the bottom wall, the bottom wall and the side wall cooperatively define an accommodating space. The fingerprint identification sensor is received in the accommodating space. The side wall has a top end, the top end has a first face facing the flexible display screen and a second face abutting with the fingerprint identification sensor.

Figure 1:
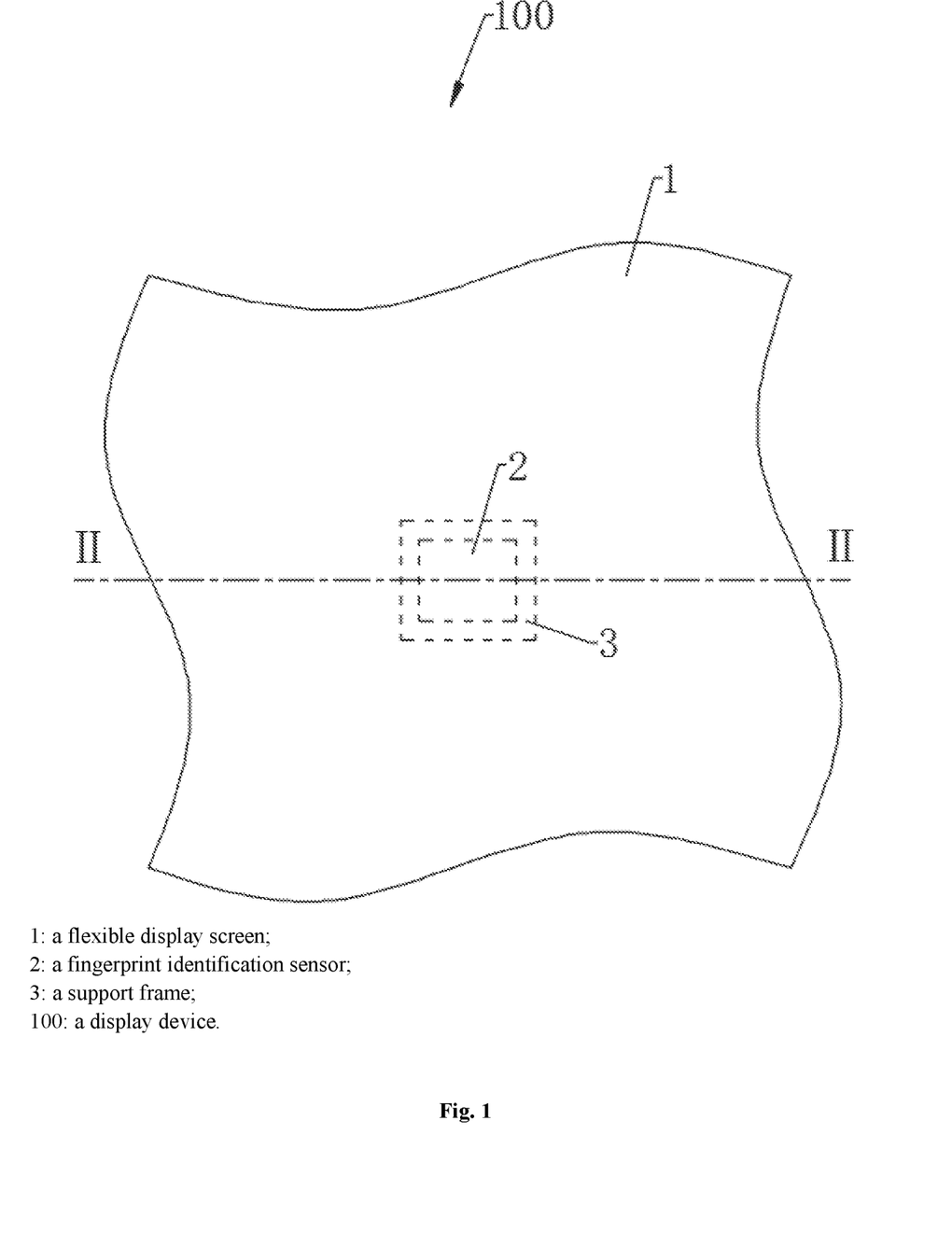
FIG. 1 is a schematic structural view of a display device provided by embodiments of the present disclosure.
Figure 2:
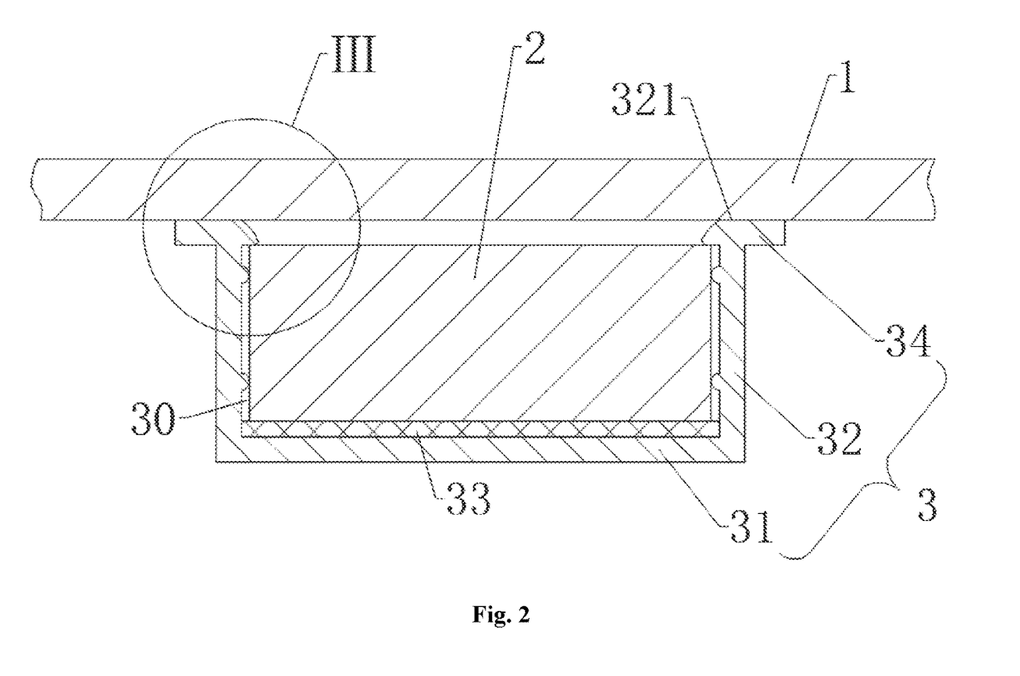
FIG. 2 is a sectional view taken along line II-II of the display device in FIG. 1.

FIG. 1 illustrates a display device 100. The display device 100 includes a flexible display screen 1, a fingerprint identification sensor 2 and a support frame 3. FIG. 2 illustrates a sectional view of the display device 100. The support frame 3 includes a bottom wall 31 and a side wall 32 provided around the periphery of the bottom wall 31, the bottom wall 31 and the side wall 32 cooperatively define an accommodating space 30. The fingerprint identification sensor 2 is received in the accommodating space 30. A top face 321, spaced from the bottom wall 31, of the side wall 32 is fitted closely to the flexible display screen 1.

During assembling the display device 100, the fingerprint identification sensor 2 can be first mounted in the accommodating space 30 inside the support frame 3, then the top face 321 of the support frame 3 can be fitted closely to the flexible display screen 1, enabling the fingerprint identification sensor 2 to be fixed relative to the flexible display screen 1. When the light passes through the flexible display screen 1 and enters the fingerprint identification sensor 2, the fingerprint identification sensor 2 can identify a user's fingerprint which is in contact with the flexible display screen 1. Since the area of the top face 321, i.e., the fitting area between the support frame 3 and the flexible display screen 1, is far less than the fitting area between a fingerprint identification sensor and a flexible display screen in the related art, when the top face 321 is fitted closely to the flexible display screen 1, a risk that the flexible display screen 1 is wrinkled can be effectively reduced, such that the flexible display screen 1 can keep flat, the light can pass through the flexible display screen 1 in an original light path, and a relatively high fingerprint identification accuracy of the fingerprint identification sensor 2 is allowed.

The flexible display screen 1 can be a bendable display panel. The flexible display screen 1 can be a touch screen, so as to achieve functions of display and touch control at the same time. The flexible display screen 1 can be an organic light-emitting diode (OLED) display panel. The fingerprint identification sensor 2 is used for identifying the user's fingerprint by means of the light. The light identified by the fingerprint identification sensor 2 can be emitted by the fingerprint identification sensor 2 itself, and reflected by the user's finger after passing through the flexible display screen 1. Or the light identified by the fingerprint identification sensor 2 can be emitted by the flexible display screen 1 and reflected by the user's finger, then the emitted light penetrates through the flexible display screen 1 and enters the fingerprint identification sensor 2.

Figure 3:
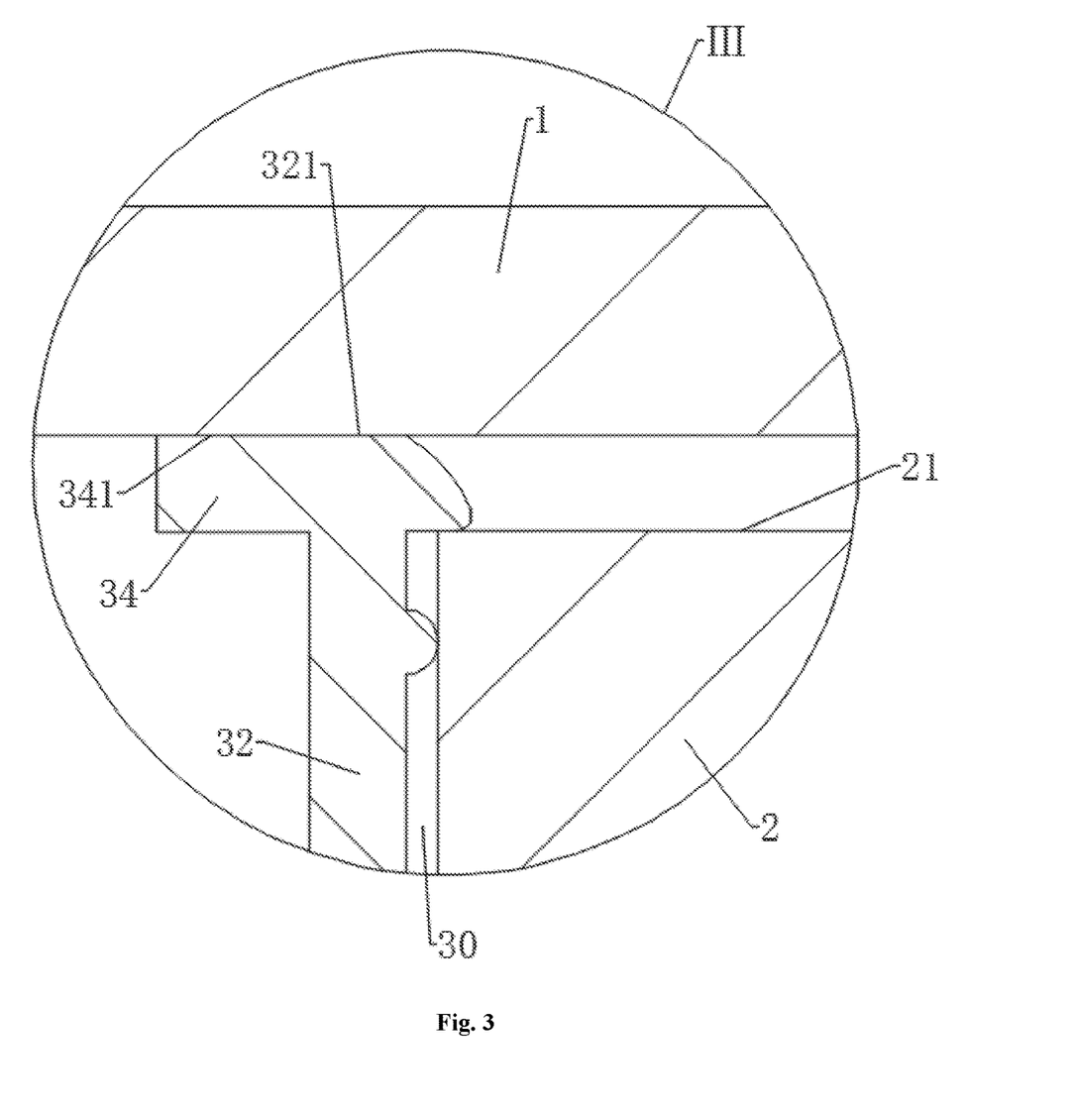
FIG. 3 is an enlarged view of a structure III circled in FIG. 2.
Figure 4:
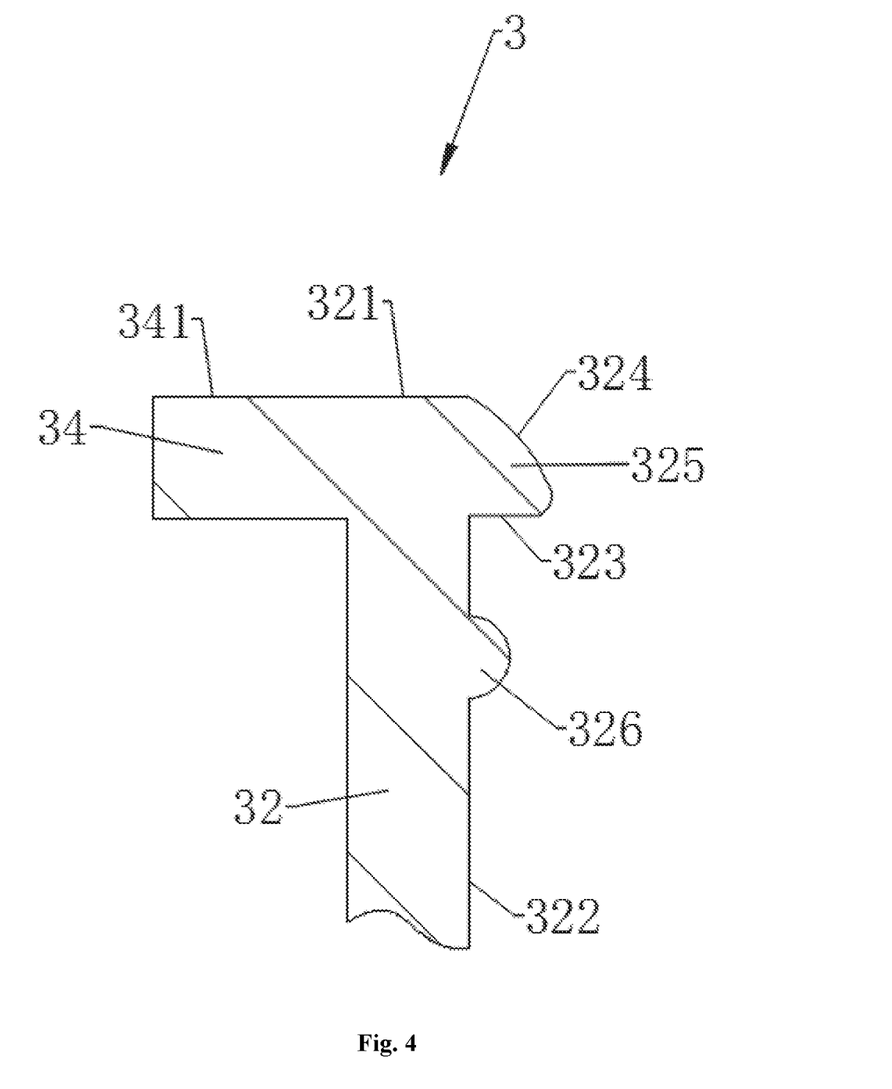
FIG. 4 is a schematic view of a partial structure of a support frame shown in FIG. 3.

FIG. 3 is an enlarged view of a structure III circled in FIG. 2, and FIG. 4 is a schematic view of a partial structure of a support frame shown in FIG. 3. An inner side face 322 of the side wall 32 is provided with a limiting face 323. A surface 21, facing the flexible display screen 1, of the fingerprint identification sensor 2 is in contact with the limiting face 323. In the present embodiment, the limiting face 323 is used for limiting a position of the fingerprint identification sensor 2 in a light emitting direction of the flexible display screen 1, such that a suitable relative position relationship can be provided between the fingerprint identification sensor 2 and the flexible display screen 1 by the arrangement of the limiting face 323, further improving the identification accuracy of the fingerprint identification sensor 2.

It could be understood that, the flexible display screen 1 is fitted closely to the top face 321, thus the flexible display screen 1 is substantially parallel to the top face 321. A signal acquisition face of the fingerprint identification sensor 2 and the surface 21, facing the flexible display screen 1, of the fingerprint identification sensor 2 form a certain relative position relationship therebetween, such as being coplanar, parallel or defining a predetermined angle. Embodiments of the present disclosure take the two being coplanar as an example to describe.

Optionally, the limiting face 323 is substantially parallel to the top face 321 or an angle less than or equal to 5° is defined between the limiting face 323 and the top face 321.

In the present embodiment, by defining the position relationship between the limiting face 323 and the top face 321, the position relationship between the flexible display screen 1 and the signal acquisition face of the fingerprint identification sensor 2 can be defined. When the signal acquisition face is substantially parallel to the flexible display screen 1 or a small angle is defined between the signal acquisition face and the flexible display screen 1, the signal acquisition face can acquire the light passing through the flexible display screen 1 well, thus the fingerprint identification sensor 2 has higher identification accuracy.

Optionally, a distance between the limiting face 323 and the top face 321 is larger than or equal to 0.1 mm, allowing a gap larger than or equal to 0.1 mm between the fingerprint identification sensor 2 and the flexible display screen 1, thereby reducing a processing difficulty in fitting the top face 321 to the flexible display screen 1, improving the fitting precision, such that the display device 100 has a relatively high product yield and the fingerprint identification sensor 2 has the relatively high identification accuracy.

For example, the distance can be larger than or equal to 0.15 mm while smaller than or equal to 0.25 mm, for example, the distance can be about 0.2 mm.

Optionally, a transition arc face 324 is provided between the top face 321 and the limiting face 323, facilitating mounting the fingerprint identification sensor 2 in the accommodating space 30. In this case, the transition arc face 324 and the limiting face 323 cooperatively define a limiting block 325 of the inner side face 322.

In the present embodiment, the support frame 3 is deformable to a certain extent under the action of an external force. The support frame 3 is deformed by the external force, and after the fingerprint identification sensor 2 is mounted in the accommodating space 30, the external force is withdrawn, and then the support frame 3 returns to an original shape. The arrangement of the transition arc face 324 is beneficial to reduction of the assembly difficulty of the fingerprint identification sensor 2.

Optionally, a pressing member 33 is provided in the accommodating space 30. The pressing member 33 is deformed under the action of an external force. The pressing member 33 is tightly pressed between the fingerprint identification sensor 2 and the bottom wall 31, so as to tightly press the fingerprint identification sensor 2 to the limiting face 323. In this case, the bottom wall 31, the pressing member 33 and the limiting face 323 cooperate with each other, so as to better limit the position of the fingerprint identification sensor 2. At the same time, the pressing member 33 can absorb a part of processing tolerance, thereby reducing the assembly difficulty of the fingerprint identification sensor 2.

The pressing member 33 is an elastic member, such as spring, foam, rubber and the like. Certainly, in other embodiments, the elastic member can also be a flexible member, as long as it can cooperatively press the fingerprint identification sensor 2.

Optionally, the inner side face 322 is provided with a plurality of bulges 326. The plurality of bulges 326 are distributed around the fingerprint identification sensor 2 at intervals, so as to contact and limit the position of the fingerprint identification sensor 2. The plurality of bulges 326 entirely limit the position of the fingerprint identification sensor 2 in a plane perpendicular to the light emitting direction of the flexible display screen 1, such that the support frame 3 can position and fix the fingerprint identification sensor 2 well.

As an optional embodiment, with reference to FIGS. 2-4, the support frame 3 further includes a flange 34, the flange 34 is provided at an end, spaced from the bottom wall 31, of the side wall 32. An upper surface 341, spaced from the bottom wall 31, of the flange 34 is coplanar with the top face 321. In this case, the upper surface 341 and the top face 321 both can be fitted closely to the flexible display screen 1 at the same time, such that the fitting area between the support frame 3 and the flexible display screen 1 can be properly increased within a reasonable range, so as to enhance the structural strength and reliability of the display device 100.

Figure 5:
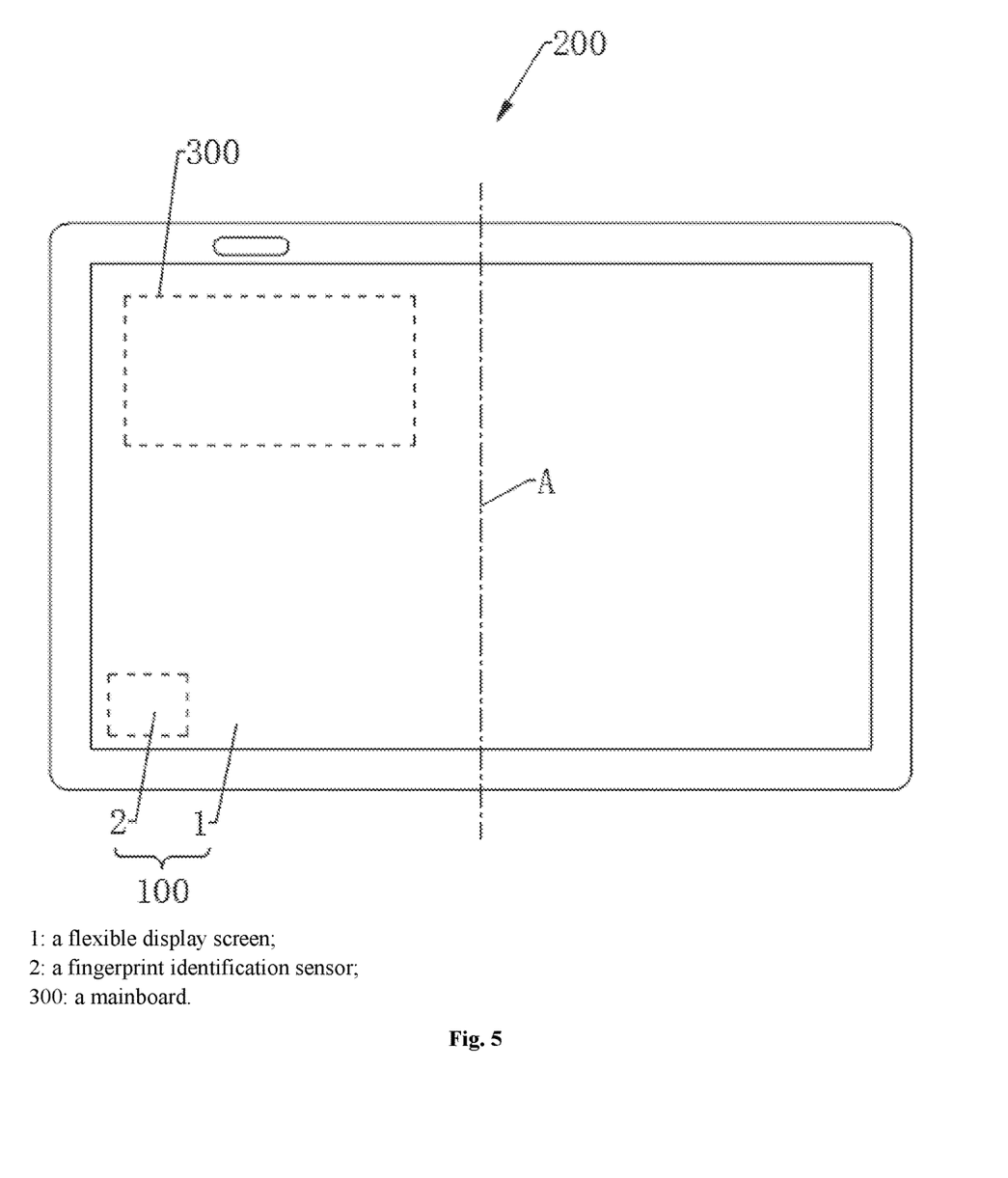
FIG. 5 is a schematic structural view of a mobile terminal provided by embodiments of the present disclosure.

FIG. 5 illustrates a mobile terminal 200. The mobile terminal includes a mainboard 300 and the display device 100 of the above embodiments. The mobile terminal 200 can be a foldable terminal. The mobile terminal 200 can be unfolded or folded about an axis A. The mobile terminal 200 can be a mobile phone, a tablet personal computer (PC) or a laptop.

The flexible display screen 1 and the fingerprint identification sensor 2 both are electrically coupled with the mainboard 300. The mainboard 300 controls the flexible display screen 1 to conduct the display (and touch recognition). The fingerprint identification sensor 2 sends acquired user's fingerprint to the mainboard 300.

As for the mobile terminal 200 of the present embodiment, the fingerprint identification sensor 2 and the flexible display screen 1 are superimposed, so as to increase a screen-to-body ratio.

Embodiments of the present disclosure are described in detail in the above, specific examples are applied in the description to explain principles and implementation methods of the present disclosure, and the explanations of the above embodiments are just used for understanding methods and core concepts of the present disclosure; at the same time, to those skilled in the art, in light of concepts of the present disclosure, there are variations in both the implementations and application range. From the above, contents of the description should not be construed to limit the present disclosure.

What is claimed is:

1. A display device comprising:
   a flexible display screen;
   a fingerprint identification sensor; and,
   a support frame, the support frame comprising:
      a bottom wall, and
      a side wall surrounding the bottom wall at a bottom end of the side wall, the bottom wall and a first side of the side wall cooperatively defining an accommodating space, the fingerprint identification sensor being received in the accommodating space,
      the side wall having a top end opposite the bottom end, the top end having:
         a first face facing the flexible display screen,
         a second face extending from the first side of the side wall abutting with the fingerprint identification sensor, and
         a flange extending from a second side of the side wall opposite the first side, the flange having a surface coplanar with the first face.

2. The display device according to claim 1, wherein the second face is parallel to the first face or an angle less than or equal to 5 degrees is defined between the second face and the first face.

3. The display device according to claim 1, wherein a distance between the second face and the first face is larger than or equal to 0.1 mm.

4. The display device according to claim 1, wherein the flexible display screen is parallel to the first face.

5. The display device according to claim 1, wherein the support frame is deformable.

6. The display device according to claim 1, wherein the fingerprint identification sensor has a signal acquisition face and a surface facing the flexible display screen, the signal acquisition face and the surface are coplanar.

7. The display device according to claim 1, wherein the first face and the second face define a transition arc face therebetween, the transition arc face is configured to facilitate mounting the fingerprint identification sensor in the accommodating space.

8. The display device according to claim 7, the first side being an inner side face of the side wall; wherein the transition arc face and the second face cooperatively define a limiting block of the inner side face of the side wall.

9. The display device according to claim 1, the first side being an inner side face of the side wall; wherein the inner side face includes a plurality of bulges, the plurality of bulges are distributed around the fingerprint identification sensor at intervals, and the plurality of bulges are configured to contact and limit a position of the fingerprint identification sensor.

10. The display device according to claim 9, wherein the plurality of bulges entirely limit the position of the fingerprint identification sensor in a plane perpendicular to the light emitting direction of the flexible display screen.

11. The display device according to claim 1, wherein the accommodating space is provided with a pressing member therein, the pressing member is between the fingerprint identification sensor and the bottom wall, so as to press the fingerprint identification sensor to the second face.

12. The display device according to claim 11, wherein the pressing member is an elastic member.

13. The display device according to claim 11, wherein the pressing member is a flexible member.

14. A mobile terminal comprising a mainboard and a display device, the display device comprising:
   a flexible display screen;
   a fingerprint identification sensor, the flexible display screen and the fingerprint identification sensor both being electrically coupled with the mainboard; and,
   a support frame, the support frame comprising:
      a bottom wall, and
      a side wall surrounding the bottom wall at a first end of the side wall,
      the bottom wall and the side wall cooperatively defining an accommodating space, the fingerprint identification sensor being received in the accommodating space,
      a second end, opposite the first end, extending from the side wall having:

a lower surface extending from an inner side face of the side wall and in contact with a surface, facing the flexible display screen, of the fingerprint identification sensor, and an upper surface in contact with the flexible display screen, the second end further having a flange extending from the side wall opposite the lower surface, and the flange having a surface coplanar with the upper surface.

15. The mobile terminal according to claim 14, wherein the flexible display screen is a bendable touch screen.

16. The mobile terminal according to claim 14, wherein the upper surface of the boss is parallel to the flexible display screen.

17. The mobile terminal according to claim 14, wherein the inner side face provided with a plurality of bulges extending from the inner side face, the plurality of bulges are configured entirely limit the position of the fingerprint identification sensor in a plane perpendicular to the light emitting direction of the flexible display screen.

18. The mobile terminal according to claim 14, wherein the accommodating space is provided with a rubber member therein, and the rubber member is located between the fingerprint identification sensor and the bottom wall.

19. A tablet personal computer, comprising a mainboard and a display device, the display device comprising:

an OLED display panel;

a fingerprint identification sensor, the OLED display panel and the fingerprint identification sensor both being electrically coupled with the mainboard; and, a support frame, the support frame defines an accommodating space, the fingerprint identification sensor being received in the accommodating space, the accommodating space having:

a side wall and a bottom wall located at a first end of the side wall, a second end of the side wall being opposite the first end and having:

a lower surface extending from a first side of the side wall and in contact with a surface, facing the OLED display panel, of the fingerprint identification sensor, and an upper surface in contact with the OLED display panel, a flange extending from a second side of the side wall opposite the first side, the upper surface having an area less than that of the surface, facing the OLED display panel, of the fingerprint identification sensor, and the flange having a surface coplanar with the upper surface.

20. The tablet personal computer according to claim 19, wherein the support frame is deformable.

* * * * *